Jan. 14, 1941.  S. S. JERWAN  2,228,765
BRAKE DEVICE FOR DRINK MIXERS
Filed Sept. 26, 1938   2 Sheets-Sheet 1
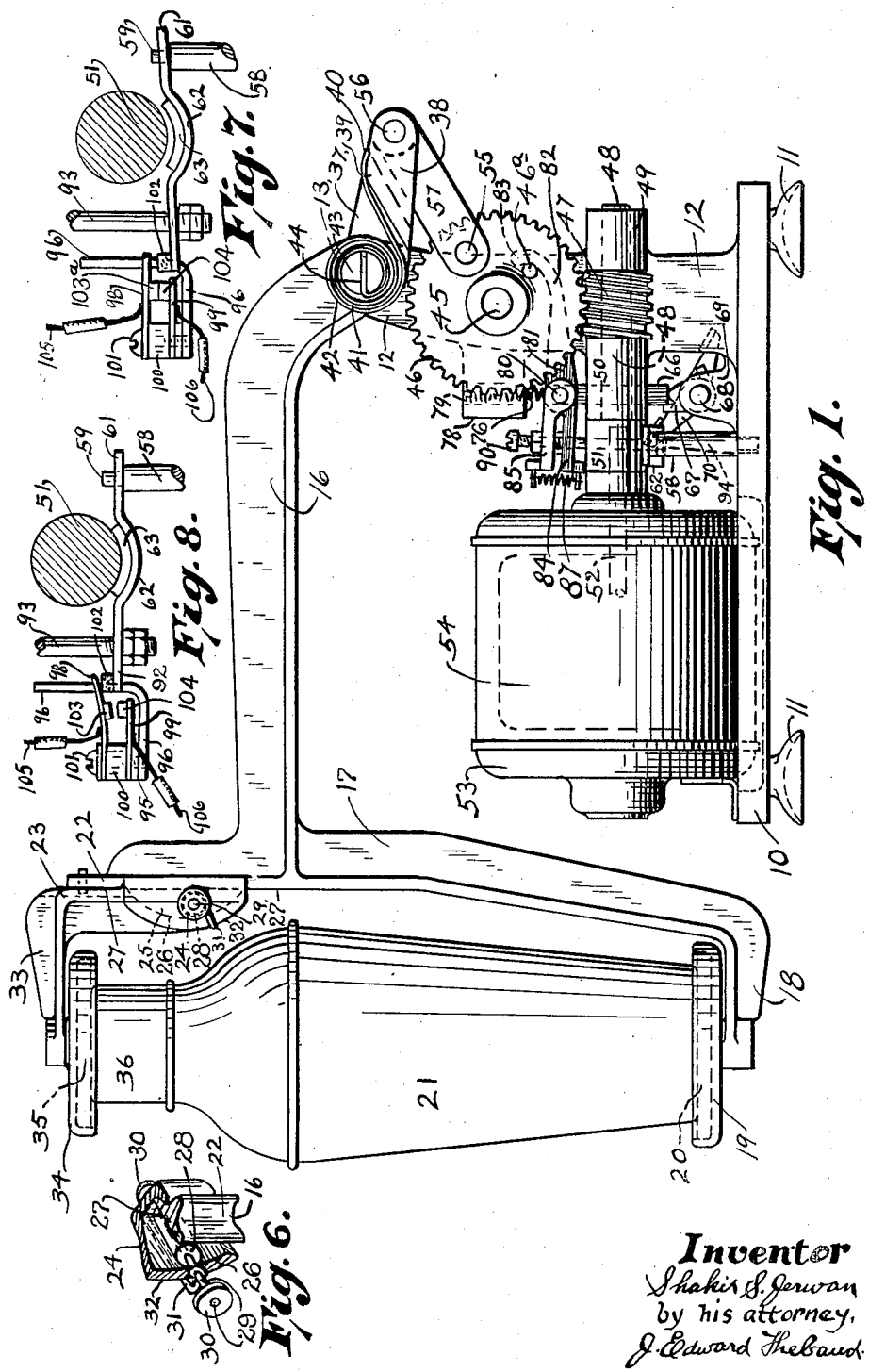
Inventor
Shakir S. Jerwan
by his attorney,
J. Edward Thebaud.

Jan. 14, 1941.  S. S. JERWAN  2,228,765
BRAKE DEVICE FOR DRINK MIXERS
Filed Sept. 26, 1938  2 Sheets-Sheet 2

Inventor.
Shakir S. Jerwan,
by his attorney,
J. Edward Thebaud.

Patented Jan. 14, 1941

2,228,765

UNITED STATES PATENT OFFICE 2,228,765

BRAKE DEVICE FOR DRINK MIXERS

Shakir S. Jerwan, Philadelphia, Pa.

Application September 26, 1938, Serial No. 231,663

4 Claims. (Cl. 192—2)

This invention relates to drink mixers, particularly to that class thereof, wherein the drink container is shaken, by power, to mix the contents, held in said container.

The drink mixer, which is the subject of my U. S. Patent Number 1,494,246, issued May 13, 1924, is of the class referred to.

In practice, I have found that the mixer construction, shown in the said patent, is unreliable in operation. The parts, being belt driven, lack that positive and constantly applied and transmitted force needed particularly at the ends of the oscillating strokes, to overcome the strains due to the sudden changes of direction of movement, of the drink container, and its contents. Besides this fault, the brake device of said patent is of a construction which can not be depended upon. It involves movements of the brake shoe sidewise, as well as in a radial direction, when thrown in, and out of engagement with the brake drum, besides this, it depends upon its insecure engagement with a pin, on a standard, to keep it from accidentally throwing the brake on, while the mixer is in operation.

Among the various objects of the present invention, relative to overcoming the above mentioned faults of construction, is the provision of such construction, as will afford a direct driving connection, with the armature, of the motor used, so as to transmit the benefit of the inertia of the armature to the operating parts so as to definitely offset the extra strain, due to changes of direction, in the oscillations of the drink container and its contents, and thus insure a more smooth and regular action of the mixer during the running of the motor.

A further object of this invention is to provide a strong, securely set, and manually operated, brake device for the mixer, which will be adapted to move the brake shoe on or off the brake drum in one kind of direction only, that is radial to the brake drum. In this connection, another object is to provide means, including a cam, for manually throwing the brake on or off, in a positive and reliable manner.

A further object is to provide adjusting means in connection with the brake device, for adjusting the pressure of the brake shoe, against the brake drum, particularly after wear takes place.

With these and other objects, which will hereinafter appear, my invention resides in certain improved construction, one embodiment of which is shown in the drawings, and is hereinafter described. The functioning of the parts is explained and what I claim is set forth.

In the drawings,

Figure 1 is a side elevation of a drink mixer embodying my invention, and is shown for a down-position of the container.

Figure 6 is a fragmentary perspective view of the locking roller, clamping means for the container holder.

Figure 7 is a side elevation of certain brake parts and the electric switch, showing their relative positions, when the brake is off, and the switch is closed for the running of the machine.

Figure 8 is a side elevation of the parts shown in Figure 7, but relatively positioned, as when the brake is on, and the switch is open, with the machine stopped.

Figure 3:
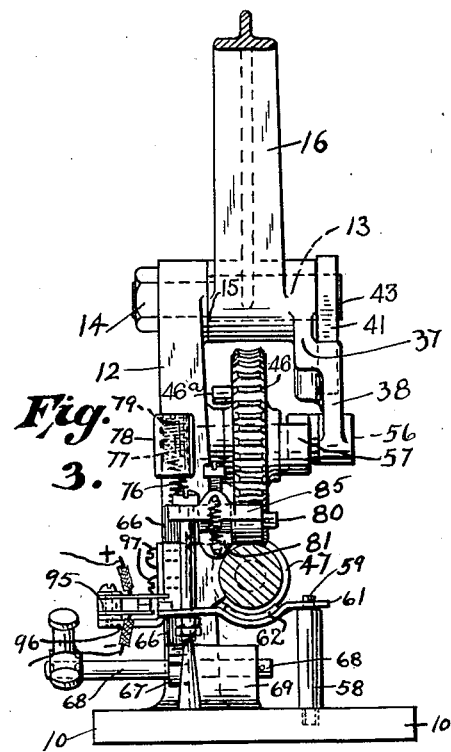
Figure 3 is an end elevation of the parts shown in Figure 2.

In the figures, the drink mixer is shown to have a base 10, to the underside of which is fixed suction cups 11, for holding the mixer more firmly upon any smooth surface upon which it may rest. Integral with and upstanding from the base 10 is a standard 12, having fixed in its upper end the horizontal, shouldered bolt 13, secured thereto, by the nut 14. The shoulder 15, bears against the standard 12. Journalled for oscillation upon the bolt 13, is the shaker arm 16, formed at its swinging end into an L-shaped portion 17, which terminates below in a horizontal leg 18, upon which is mounted a circular seat 19, covered by a pad 20, adapted to have a drink container 21, rest thereon. The upper part of the portion 17, of the arm 16, is formed into a guide bar portion 22, engaged by an L-member 23. Where the L-member 23 engages the guide bar portion 22, of the arm 16, there is formed a locking device 24, for the L-member 23, which permits any down movement of the L-member upon the guide bar portion 22, but automatically checks any upward movement, of this L-member 23, until released. This device 24 includes a pocket 25, having inside an upright, concave, cylindrical surface 26, the axis, of which surface 26, is horizontal. Between the curved surface 26, and the flat upright surface 27, of the guide bar portion 22, there is lodged a roller 28, having an axle rod 29 terminating outside in buttons 30, there being one button at each end of the rod 29. A wire yoke 31, journaled upon the rod 29, behind the buttons 30, crosses the outside curved portion 32, of the L-member 23. The axle rod 29, of the roller 28, passes loosely through holes in the walls of the device 24, permitting one to release the roller 28 by lifting on the buttons 30.

The L-member 23 has a horizontal leg 33, reaching in the same direction as the leg 18 and has fixed thereto, the cap 34, beneath which is fixed a pad 35, adapted to rest firmly upon the cover cap 36, of the drink container 21.

Returning to the journalled end of the shaker arm 16, at the bolt 13, there is a lever-extension 37, integral with the arm 16, reaching rearwardly. This lever-extension 37, has its outer portion 38, offset to form a shoulder 39, upon which bears the leg 40, of a coiled leaf spring 41, the convolutions 42, of which surround the head of a screw 43, which holds the arm 16, upon the bolt 13. This screw 43 is firmly fixed in the end of the bolt 13, which is firmly fixed to the standard 12. The inner end of the spring 41, engages the slot 44, of the screw 43. The spring 41 is coiled about and fixed to the head of the screw 43, in a manner to have the spring leg 40 bear down on the rearwardly reaching lever-extension 37, so as to partially offset the weight of the swinging end of the shaker arm 16, with the drink container 21.

Horizontally fixed in the standard 12, is an axle pin 45, upon which is journaled the gear wheel 46, which engages the worm piece 47. This piece 47 is fixed upon a horizontal shaft 48, journaled in the bearing extensions 49 and 50 which extend integrally out from the standard 12. The shaft 48 is fixed concentrically to the brake drum 51, which may be integral therewith. In axial alignment with the shaft 48, is the motor shaft 52, fixed to the drum 51. Mounted upon the base 10 is an electric motor 53, having the shaft 52. Fixed to the shaft 52, is the armature 54, of the motor 53. The gear wheel 46 has fixed thereto, a horizontal pin 55. The lever-extension 37, of the arm 16, has fixed at its end, a horizontal pin 56. A link 57 is journaled upon the pins 55 and 56, which it connects.

Considering the brake device, there is an upstanding post 58, fixed on the base 10. The upper end of this post 58 has a reduced portion 59, which loosely engages a hole 60, near one end of the brake beam 61. This beam 61 has a curved portion 62, positioned below the brake drum 51, forming a brake shoe, and in this brake shoe is fixed a friction lining 63. Integral with the standard 12, is an arm extension 64, which has a vertical, square hole 65, slidingly engaged by a square rod 66. This rod 66 rests upon a cam 67, which is fixed to a shaft 68, journaled in the block 69, integral with the base 10. The shaft 68 has fixed to its outer end, a double handle 70, having finger parts 71 and 72. The cam 67, has a high portion 73, and a low portion 74, relative to the shaft 68. Limit stops 75, are integral with the cam 67, to limit the turning thereof. Pressing on top of the square rod 66, is a coiled compression spring 76, which enters a vertical hole 77, in the arm extension 78 of the standard 12. In threaded engagement with the upper end of the hole 77, is an adjusting screw 79, which bears against the upper end of the spring 76, within the hole 77. Extending at right angles with the top part of the square rod 66 and integral therewith, is the horizontal shaft 80, upon which is journaled a brake arm or trigger 81, at right angles to the shaft 80. This arm 81, has an upwardly curved portion 82, terminating in knob 83. The curved portion 82, of the arm 81, is positioned in a vertical plane, just behind the gear wheel 46, and is also positioned to be raised or lowered, respectively, in and out of engagement with a pin 46ª, fixed in, and projecting rearwardly from the wheel 46. Extending in the opposite direction to the arm portion 81, is a portion 84, in line therewith. Also journaled upon the shaft 80, at the outer end thereof, is an L-plate or piece 85, which has a portion 86, reaching over the arm portion 84. A tension spring 87, connects the pin 88, fixed in the arm portion 84, with the pin 89, fixed in the L-plate 85. Bearing on top of the arm portion 84, is an adjusting screw 90, in threaded engagement with the L-plate 85. 91 is a lock-nut on the screw 90. Connecting the end portion 92, of the brake beam 61, with the L-plate 85, is the bolt 93, directly below which is shown a tapered stop post 94, fixed upon the plate 10. The post 94 is adapted, by its position, to have the lower end of the bolt 93 rest thereon, when the brake is off.

Adjoining the brake beam end 92, is the switch 95, (see Figures 3, 7 and 8) mounted upon the bracket plate 96, fixed by screws 97, to the arm extension 64. The switch 95 has two plates, 98 and 99, which are insulated from one another and from the plate bracket 96, and extend from a separating insulating piece 100. The parts are held together, attached to bracket 96 by the screw 101. The upper plate 98 is more flexible than the lower plate 99, and its free end is positioned to be lifted by the brake beam end 92, with its insulating block 102. The plate 98 has fixed thereto, a depending metal contact piece 103, adapted to contact the metal contact piece 104, fixed upon the plate 99. Fixed to the plate 98, is a wire connection 105, and fixed to the plate 99 is a wire connection 106. The connections 105 and 106 are connected with an electric circuit (not shown), which passes through the electric motor 53.

The operation of the drink mixer is as follows: The filled drink container 21 is positioned, as shown in Figure 1, upon the pad 20, and the L-member 23 is pushed down upon the top of the container cap 36, and is secured thereto automatically by the locking device 24. In locking action the roller 28, of this locking device tends to roll tighter against the curved surface 26, for any upward movement of the L-member 23, but is released by lifting the roller 28, by raising the buttons 29 and 30.

Once having the drink container 21, thus securely fixed to the shaker arm 16, the finger piece 72, of the handle 70, is pressed down, causing the low part 74, of the cam 67, to permit the square rod 66 to drop lower, being urged to do so, by the spring 76, the pressure from which, may be adjusted by the screw 79. As the rod 66 drops, the attached parts of the brake device drop with it, and the end 92, of the brake beam 61, drops away from the end of the upper plate 98, of the switch 95, bringing the contacting pieces 103 and 104, together, closing the circuit upon the motor 53. As the motor runs, the worm piece 47 turns the gear wheel 46, which, by means of the link 57, connecting the gear 46 with the extension 37, of the shaker arm 16, oscillates the same, and shakes the container and its contents, up and down.

After sufficiently shaking and mixing the contents of the container 21, the motor is shut off, by opening the switch 95, and applying the brake in a manner to bring the container 21 into the down position, shown in Figure 1, after which, the buttons 29 and 30, are gripped by the thumb and finger of one hand and the roller 28 is released from its locked position. At the same time the L-member 23 is lifted, to release the container 21.

Considering the brake operation, in connection with that of the switch 95, the finger piece 71 of the handle 70, is pressed down to turn the cam 67, to bring the high part 73 thereof, directly under the square rod 66, lifting the same against the pressure of the spring 76. As the rod 66 is lifted, the brake device parts journaled on and connected with the horizontal shaft 80, are also lifted. The L-plate 85, with the arm 81 is thus raised, and as the L-plate 85 goes up, it lifts the end 92, of the brake beam 61, which is attached to the L-plate 85, by the bolt 93. As the end 92, of the brake beam 61, raises, it lifts up the end of the switch plate 98, breaking the contact between the contact pieces 103 and 104, opening the switch 95, cutting off the circuit on the motor. Simultaneous with the opening of the switch 95, the brake lining 63, of the brake shoe 62, is forced against the under side, of the brake drum 51, to stop the motor 53. At the same time, by the lifting of the arm 81, the curved part 82, thereof, is brought into the path of the revolving pin 46$^a$, on the wheel 46, and the arm 81 is partially pressed down to turn on the shaft 80, and the extension 84, of the arm 82, is additionally lifted, carrying with it the brake beam 61, to more firmly press the brake shoe 62 against the brake drum 51, making it more effective in stopping the motor 53. As the movement of the gear wheel 46 thus slows down, the pin 46$^a$ comes against the knob 83, to effectively stop the mixing device, at a point to have the container 21 in its lowest position. It is possible that the mechanism of the mixing device will stop before the pin 46$^a$ has reached the knob end of the arm 81, in which case the knob 83 would not be needed. The pressure of the brake shoe 62, against the brake drum 51 can be increased by screwing the screw 90 down, so as to further raise the L-plate 85, relative to the arm extension 84, and thus, through connection with the brake beam 61, lift the end 92, thereof, a little higher, so that as the beam 61 fulcrums on top of the post 58, the brake shoe 62 will have a tighter grip upon the brake drum 51. Unscrewing the adjusting screw 90 will obviously have the opposite effect on the brake. The lock nut 91 should be tightened on the screw 90, against the L-plate 85. once the adjustment of the brake has been effected, to secure the same.

Figure 2:
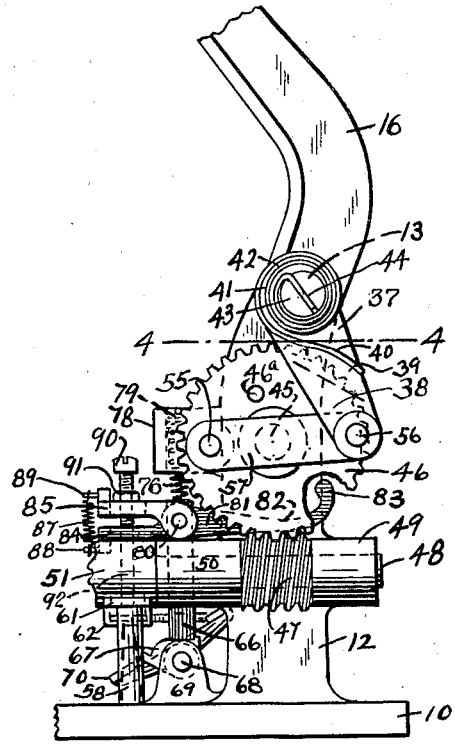
Figure 2 is a side elevation of the principal co-ordinated parts, of what is shown in Figure 1, but here shown for an up-position of the container.
Figure 4:
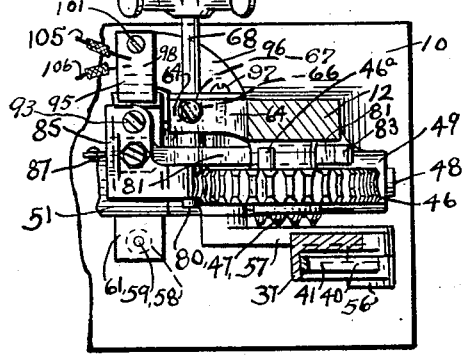
Figure 4 is a horizontal section taken on the line 4—4 of Figure 2.
Figure 5:
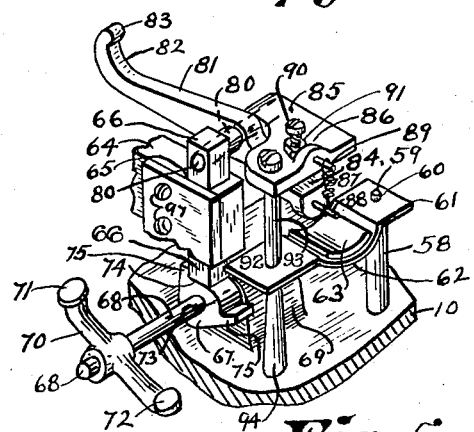
Figure 5 is a perspective view of the brake shoe and adjoining parts of the brake device, of my improved drink mixer.
Figure 9:
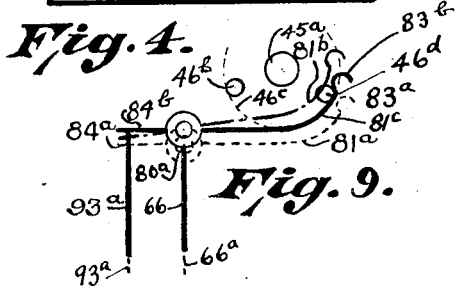
Figure 9 is a diagram, relating to the on and off positions, of certain brake members.

Referring again to the functioning of the trigger 81, in connection with the rotating pin 46$^a$, the various positions taken by the trigger 81 and parts immediately connected therewith, these parts are diagrammatically illustrated in Figure 9, wherein the position taken by these parts, when the mixer is operating, is shown by the lines of dashes, where 81$^a$ corresponds to the position of the trigger 81, 80$^a$ corresponds to the position of the shaft 80, and 66$^a$ corresponds to the down position of the square rod 66. 93$^a$ corresponds to the down position of the lower end of the bolt 93, as it rests upon the post 94, 45$^a$ is the fixed position of the shaft 45, about which the gear 46 operates, and 46$^b$ represents the pin 46$^a$, turning in the broken line, circular path 46$^c$. It will here be noted that the knob end 83$^a$, of the trigger is out of range of the path 46$^c$, of the pin 46$^a$, which is the position shown for the respective parts, in Figures 2, 3 and 5, for the running of the mixer. When the rod 66 is raised by the cam 67, the trigger takes the dot and dash line position, of Figure 9, marked 81$^b$, into the path of the rotating pin 46$^b$, which pin throws the trigger down into the heavy line position 81$^c$, the pin 46$^b$ coming to a stop, in the position marked 46$^d$, up against the 83$^b$ and the end 84$^b$, (representing the trigger extension 84) is raised from its dash line position 84$^a$, to its full line position 84$^b$, and at the same time lifts harder on the bolt 93, represented by the full line 93$^a$, to further tighten the brake action on the brake drum 51. The positions just described, are those taken by corresponding parts, shown in Figures 1 and 8, when the container 21 has come to rest in its low position.

Considering the fact that, in connection with the moving parts of the mixer, the armature 54 is directly connected with the worm 47, in mesh with the gear 46, it is obvious that there can be no slippage that would lose the effect of the inertia of the armature, when the motor is running. Slippage where a belt connection between the armature and the worm drive is used, can be expected. The mixer construction, shown in my said former patent, includes a belt. By tests, made upon a mixer, made in accordance with the construction herein illustrated and described, it was shown that the faults above referred to, relative to the mixer of the said former patent, have been overcome by my improved constuction.

Inasmuch as changes can be made in the one embodiment of the drink mixer herein shown and described, without departing from the spirit of my present invention, I wish to include all forms which come within the scope of the following claims.

I claim,

1. In a device of the class described, having a frame and a first shaft on said frame, there being a motor for turning said first shaft and means for throwing said motor into and out of action, a second shaft on said frame and a rotating member on said second shaft adapted to rotate in operative connection with said first shaft, the combination in a brake mechanism of a brake drum fixed on said first shaft, a support on said frame, a brake beam fulcrumed at one end on said support and adapted to bring pressure against said brake drum, a tripping member on said rotating member spaced from said second shaft, a bearing on said frame, a cam shaft journaled in said bearing, a cam fixed to said cam shaft, manually operated means for turning said cam shaft, a projection to said frame, a rod in sliding engagement with said projection and in bearing contact with said cam, said rod being adapted to be moved longitudinally by said cam, a second means connecting said rod with said brake beam at a point spaced from said support, said second means including a side extension to said rod, spaced from the contact of said rod with said cam, said second means also including a trigger arm projecting from said side extension in fixed relation to said rod, said trigger arm being positioned to be moved by said rod in relation to said cam, to come into the path of said tripping member, to cause said brake beam to bring a stopping pressure on said brake drum, and to still the operation of said device.

2. In a device of the character described, having a frame and a first shaft on said frame, there being an electric motor for turning said first shaft and an electric switch for said motor, a second shaft on said frame and a rotating member on said second shaft adapted to rotate in operative connection with said first shaft, the combination in a brake mechanism of a brake drum on said first shaft, a support on said frame, a rake beam fulcrumed at one end on said support, and adapted to bring pressure against said brake drum, a tripping member on said rotating member spaced from said second shaft, said brake beam being operatively connected with said switch to throw the same open or closed, a bearing on said frame, a cam shaft journaled in said bearing, a cam fixed to said cam shaft, manually operated means connected with said cam shaft for positioning said cam to throw the brake on or off, a projection to said frame, a rod in sliding engagement with said projection and in bearing contact with said cam, a second means connecting said rod with said brake beam at a point spaced from said support, said second means including a side extension to said rod spaced from its contact with said cam, said second means also including a trigger arm projecting from said side extension and fixed relative to said rod, said trigger arm being positioned to be moved by said rod in relation to said cam to come into the path of said tripping member to cause said brake beam to open said switch and to bring a stopping pressure on said brake drum to stop the operation of said device.

3. In the structure set forth in claim 1, a stop integral with said trigger arm, positioned to engage said tripping member as it moves in its path next to said trigger arm, to bring said device to a stop subsequent to the application of said brake beam to stop said brake drum.

4. In the structure set forth in claim 1, an adjusting means connecting said trigger arm with said side extension, for adjusting said trigger arm relative to said rod and to the said tripping member in its path of rotation.

SHAKIR S. JERWAN.